May 10, 1955

H. J. KENT 2,707,882

BALANCED GYRO

Filed March 18, 1954

FIG_1

INVENTOR.
Henry J. Kent
BY

ATTORNEY

May 10, 1955  H. J. KENT  2,707,882
BALANCED GYRO
Filed March 18, 1954  3 Sheets-Sheet 2

INVENTOR.
Henry J. Kent
BY
ATTORNEY

INVENTOR.
Henry J. Kent

United States Patent Office 2,707,882
Patented May 10, 1955

2,707,882

BALANCED GYRO

Henry J. Kent, West Englewood, N. J., assignor to Kearfott Company, Inc., Little Falls, N. J., a corporation of New York Application March 18, 1954, Serial No. 417,149

8 Claims. (Cl. 74—5.4)

This invention relates to gyros, and particularly to a balancing system to be embodied in the gyro structure to permit the gyro to be statically balanced about a sensitive axis after the gyro has been enclosed in a hermetically sealed housing.

The invention is particularly intended for adjusting a directional gyro to balance out very slight residual mechanical irregularities and to position the center of gravity of the gyro as closely as possible at the center of operation of the gyro.

The particular feature of this invention is that it permits the gyro and its gimbal and its indicator to be hermetically sealed within a metal housing. Then, by means of the present invention any necessary balancing adjustment can then be made manually from outside the sealed housing. For that operation, a flexible bellows torque transmitting system is employed, that is known as "Hermeflex" and is manufactured by the Kearfott Company, Inc.

When the gyro is finally assembled after manufacture, or upon repair, at any given latitude, any drift other than this apparent drift must be compensated for and balanced out, even in cases where a controlled fixed drift rate may later be arbitrarily introduced for certain purposes. This compensation is applied by adjusting the balance of the gyro in its horizontal plane to establish a static balance, so the center of gravity of the gyro will be essentially at the center of the gyro system.

Heretofore such adjustment to achieve exact static balance has been difficult because the gyro instrument was completely sealed in a housing, since any such necessary adjustment was possible only after the seal was broken and the gyro re-exposed for adjustment. By means of the present invention however, such adjustment is now possible without disturbance of the seal.

The construction of one embodiment of the present invention is shown in the accompanying drawings, in which.

Figure 1:
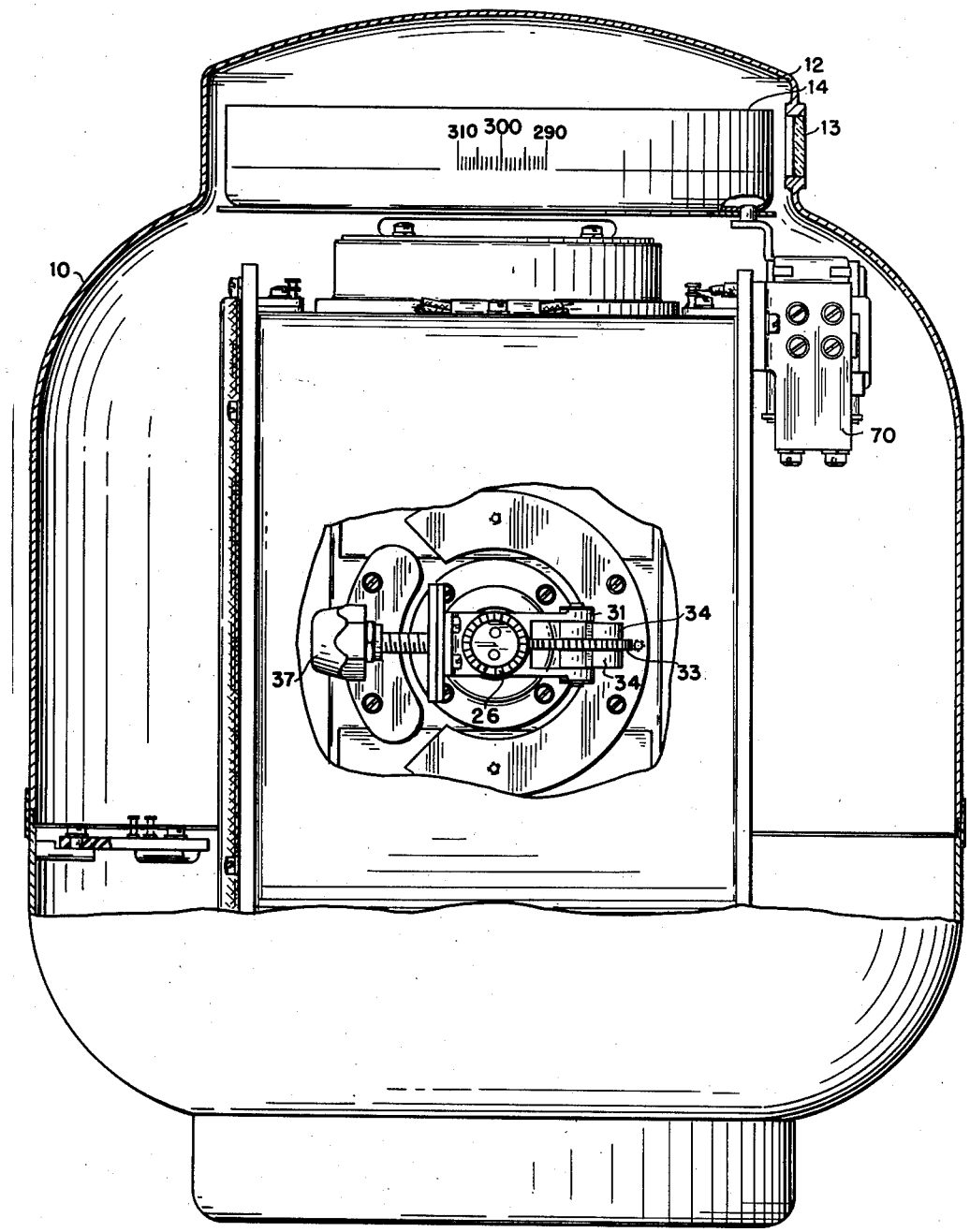
Fig. 1 is a front elevational view, with the housing being in section, of a directional gyro, with parts being broken away to show the novel balancing system.
Figure 2:
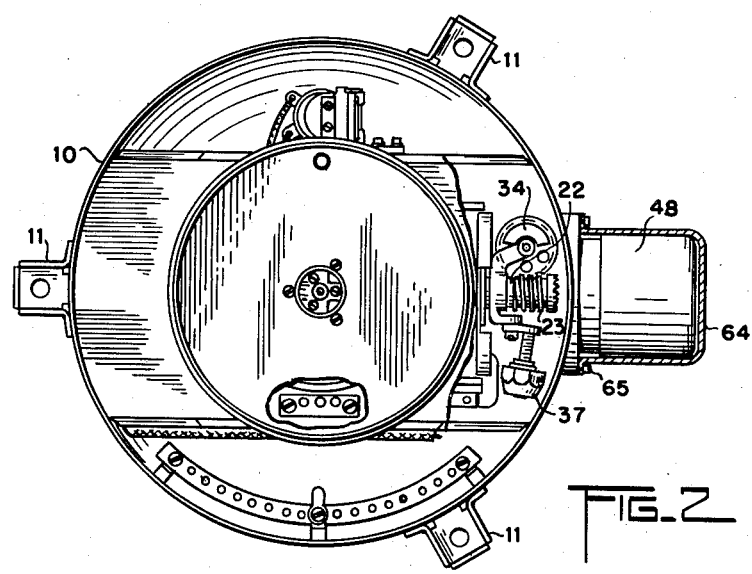
Fig. 2 is a plan view with the top cover removed to expose the directional gyro and with parts broken away to show the balancing system.
Figure 3:
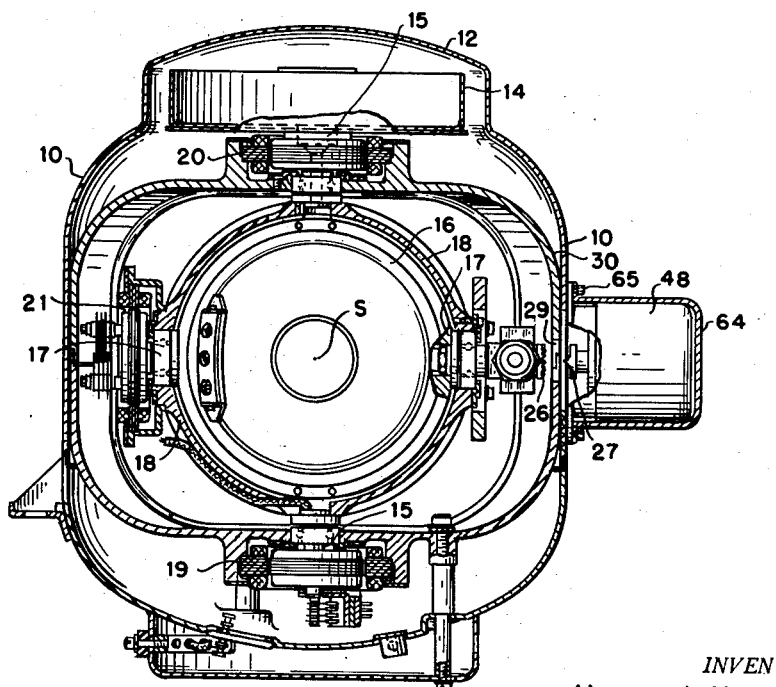
Fig. 3 is a vertical sectional view in front of the vertical axis of the gyro and the balancing system.

The sealed housing 10 has three mounting brackets 11 (Fig. 2) welded thereto for external mounting in an aircraft, and has an integral dome portion 12 (Fig. 1) provided with a glass airtight window 13, through which can be read an azimuth scale 14 mounted on the upper trunnion 15 of the vertical axis of the electrically driven gyro within a casing 16 (Fig. 3). The gyro spins about a horizontal axis S, which is at right angles to the horizontal trunnions 17 of a gimbal 18. The spin axis can be represented as a line at right angles to the plane of the paper passing through the point S in Fig. 3. A vertical axis synchro 19 has its rotor co-axially mounted on the lower trunnion 15 of the vertical axis, and on the upper trunnion 15 the rotor of a conventional torquer 20 is co-axially mounted. A horizontal axis synchro 21 has its rotor mounted on the left hand trunnion 17 of the gimbal 18 (Fig. 3).

Figure 4:
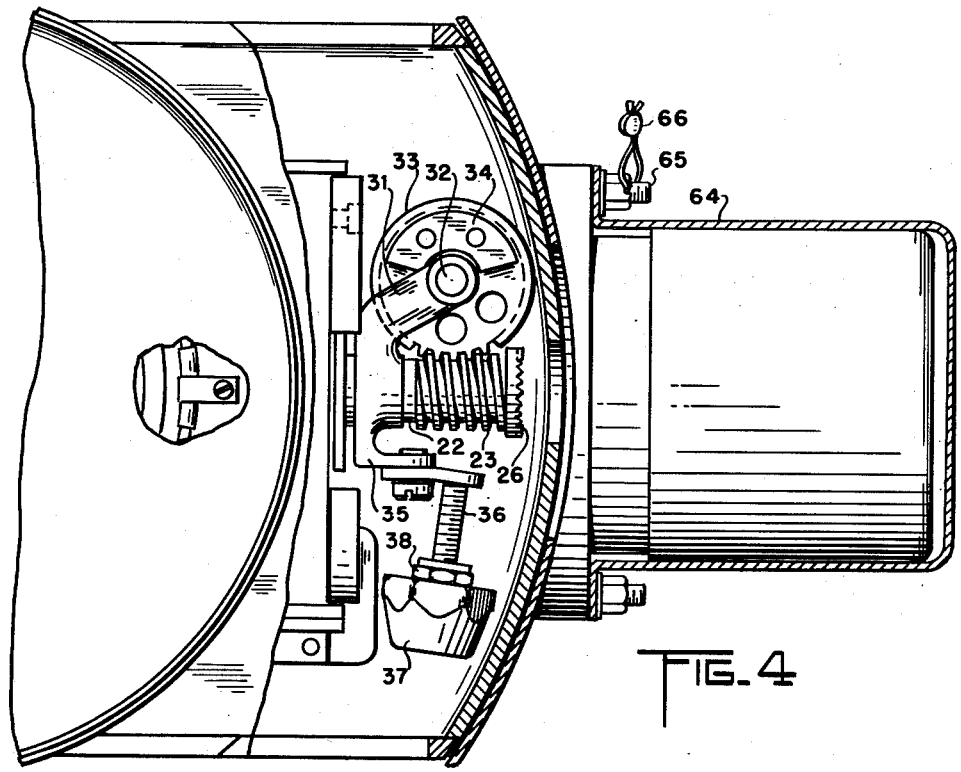
Fig. 4 is an enlarged view of a portion of Fig. 2 to show the details of the adjusting unit more clearly.
Figure 5:
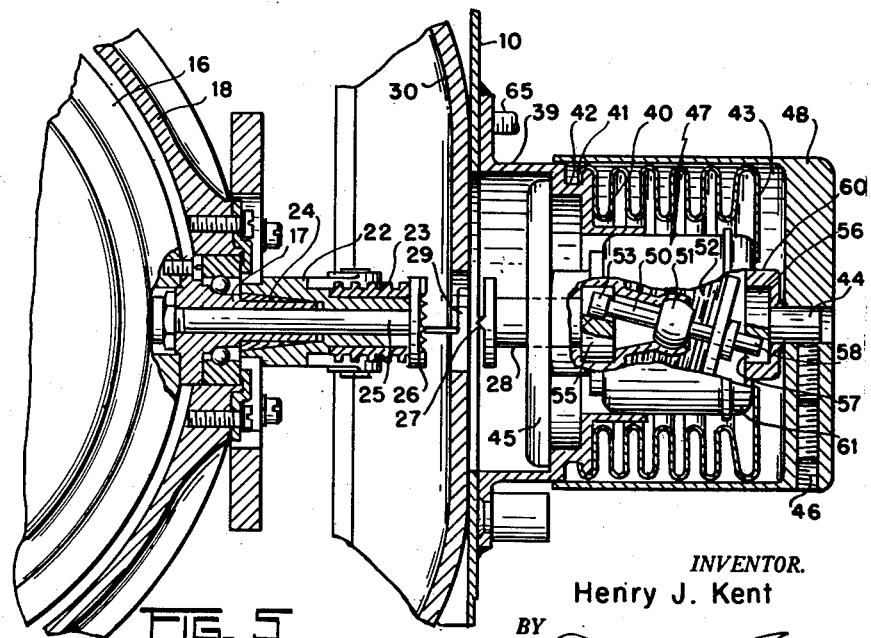
Fig. 5 is a detail vertical section view showing the "Hermeflex" balance adjusting unit.

In order to adjust the effective horizontal position and balance of the horizontal axis through the horizontal trunnions 17, the novel balancing system of the present invention is mounted on the right end trunnion 17 (Figs. 3, 4 and 5). A sleeve member 22, having a worm gear 23 journaled thereto, is mounted on and secured to the outer surface of the hollow trunnion 17 by a tapered wedge 24, which is tightly clamped by a stud 25 to securely engage trunnion 17 and sleeve 22 (Fig. 5).

The outer end of the worm gear 23 terminates in a crown gear portion 26 which is engageable with a mating gear surface 27 formed on the inner end of a drive shaft 28 that is part of the Hermeflex unit (Fig. 5).

As shown in Fig. 5, gears 26 and 27 are spaced apart and out of engagement and on opposite sides of an aperture 29 in housing 10 and in a gyro assembly support 30 that is secured to housing 10. The gear 27 and the shaft 28 are axially shiftable through aperture 29 to engage gear 27 with crown gear 26, to adjust the balancing unit.

The sleeve 22 (Fig. 4) carries a fork with integral bifurcated arms 31 that support a stub shaft 32 on which is journaled a worm wheel 33 supported to engage with the worm gear 23. The wheel 33 carries a sector-shaped weight 34 which can be angularly positioned about shaft 32 by rotation of worm gear 23. Such positioning serves to variably adjust the distance of the center of gravity of the weight 34 from the horizontal axis through the horizontal trunnions 17, and thereby serves to position the effective center of gravity of the gyro on the horizontal axis.

The sleeve 22 also carries an integral mounting lug 35 extending radially oppositely of arms 31. The lug 35 carries a screw stud 36 having a counterweight 37 screwed thereon and locked thereto by a lock nut 38 (Fig. 4). The counterweight 37, its mounting stud 36 and the lug 35 serve to balance the arms 31 and the shaft 32 together with the wheel 33 and the weight 34 for a selected position of the weight 34 about shaft 32. It may be assumed that the system is about balanced when the weight 34 is rotated 90 degrees inward from its outermost position as shown in Fig. 4. Then when the weight 34 is in the position shown in Fig. 4 the system will be in its maximum "over balance" condition; and when the weight 34 is rotated 180 degrees from the position shown in Fig. 4, the system will be in its maximum "under balance" condition. Adjustment of the weight to a position somewhere between those two limit positions will provide the necessary balance.

Fig. 5 shows the mechanism whereby the balancing system may be adjusted from outside the sealed housing 10. A sleeve member 39 has a seating flange which is brazed to housing 10, and supports a flexible bellows 40. The bellows 40 has one annular end wall with a turned-in edge 41 soldered to a groove wall 42 formed in the sleeve 39. The bellows 40 has its other or outer annular end wall with a turned-in edge 43 soldered to the housing of a conventional "Hermeflex" unit 47.

The "Hermeflex" unit 47 has an external shaft 44 which is rotatable to correspondingly rotate the inner shaft 28. A cap 48 covers the bellows 40 and has a co-axial opening to receive the external shaft 44 of the Hermeflex unit 47. A stud 46 keys the cap to the shaft 44.

The cover cap 48 serves as an operating handle to rotate shaft 44, and as an actuator to compress the bellows 40 to shift the Hermeflex 47 axially to engage the gear 27 with the crown gear 26. Upon release the bellows 40 has sufficient resiliency to bias the Hermeflex unit to disengaged position.

The sleeve body of cap 48 is of proper diameter to slide freely over the body of sleeve 39. A retaining disk 45 limits the self-expansion of the bellows 40.

The bellows 40 is shown in its extended position but it can be compressed manually by cover cap 48 to permit gear 27 to be engaged with crown gear 26. Rotation of shaft 44, by rotation of the cover member 48, will then cause rotation of shaft 28 through a sealed diaphragm, or bellows within the Hermeflex unit 47. By pressing cover cap 48 forward, that is, to the left in Fig. 5, the bellows 40 is compressed and gear 27 is moved into mesh with crown gear 26, to permit gear 26 to be adjustably positioned.

This "Hermeflex" unit is shown in U. S. Patent 2,419,074, and consists generally of a shaft for transmitting rotary motion through a sealed wall. As illustrated here, the shaft 50 is pivotally supported by a ball and socket 51 that is disposed within a closed bellows 52. The inner end 53 of the shaft 50 seats in a slot eccentrically disposed in a disc 55 secured at the back end of shaft 28. Oscillation of shaft 50 about its pivotal support ball 51 causes rotation of disc 55, and, consequently, of shaft 28, for the adjusting operation desired herein.

Oscillation of shaft 50 is accomplished by rotation of the cover 48 and the shaft 44. The shaft 44 is integral with a disc 56 which has an eccentric slot or pocket 57 to accommodate the outer end 58 of the pivoted shaft 50. The disc 56 is seated in a dome-shaped cover 60 for an enclosure cap 61 for the "Hermeflex" bellows 52. After the balance weight 34 is properly adjusted to balance the gyro, the clutch gears 26 and 27 are disengaged, and a protective closure cover 64 may be mounted over the rotatable cap 48 and secured to the housing 10 by suitable screw studs and nuts 65, which may be suitably sealed against tampering by a seal 66.

It is understood, of course, that trunnions 17 will, in operation of the gyro unit, be rotated about the vertical axis carrying the azimuth scale 14 therewith. When the balancing system is to be adjusted, the housing 10 is rotated until the scale 14 indicates a bearing of 360 degrees, which condition brings gear 26 in line with gear 27, at which point the gyro can be locked by a solenoid locking device, indicated generally at 70 in Fig. 1, while the adjustment is made. Solenoid lock 70 forms no part of the present invention and need not be described herein.

Thus, without opening the housing 10, after it is sealed closed, the balancing system of the present invention provides a ready means for access into the sealed chamber to balance the gyro.

What is claimed is:

1. A directional gyro system, comprising a gyro having a normally horizontal spin axis, gimbal and trunnion supports for mounting said gyro for precessive rotation about co-ordinate axes through said supports, azimuth indicating means carried on one pair of said gimbal and trunnion supports, gyro balancing means associated with a trunnion of a second pair of gimbal and trunnion supports, said balancing means including a hub member fixed to a trunnion of said second pair of supports, two radially oppositely disposed arms extending outwardly from said hub member in radially opposite directions, one of said arms having rotatably mounted thereto a wheel upon which is mounted an eccentric weight, the other of said arms having a counterweight mounted thereon, and means for adjusting the circumferential position of said wheel-mounted weight on said first arm to vary the effective radial position of said weight relative to the axis of the associated trunnion support, said adjusting means including a worm gear journaled on said trunnion of said second pair of supports and mating with said wheel that carries said weight.

2. A directional gyro system comprising a gyro having a normally horizontal spin axis, gimbal and trunnion supports for mounting said gyro for precessive rotation, azimuth indicating means carried by said supports, gyro balancing means carried on one trunnion to balance the gyro about one of its precessive axes, said balancing means including a hub member fixed to a trunnion of said support, two arms extending radially opposite from said hub member, one of said arms having rotatably mounted thereon a wheel upon which is mounted a weight, the other of said arms having mounted thereon a counter-weight, and means for adjusting the radial distance of said wheel-mounted weight from said hub member, said means including a worm gear journaled on said hub member and mating with said wheel carrying said weight.

3. The system as set forth in claim 2 wherein said hub member is provided with a crown gear member and said gyro gimbal members are mounted within a housing including a pressure-sealed normally rotatable shaft, said shaft terminating within said housing and supporting a toothed disc for mating with said crown gear, and spring biasing means for keeping said disc normally out of engagement with said crown gear.

4. The system as set forth in claim 3 wherein said shaft and disc are axially movable into engagement with said crown gear against spring action upon manual operation of said pressure sealed shaft.

5. The system as set forth in claim 3 wherein said pressure-sealed shaft includes a flexible metal bellows member in hermetically sealed engagement with said housing, said bellows member having an angularly disposed shaft extending therethrough and arranged to rotate said pressure-sealed shaft.

6. The system as set forth in claim 3 wherein said spring biasing is accomplished by means of a helical spring member externally mounted with respect to said housing and a cup shaped knob member mounted over said bellows member.

7. A directional gyro system comprising a gyro having a gimbal and supported with one of its axes through said gimbal in a horizontal plane; a hermetically sealed housing constituting the final outer housing enclosing said gyro and having an access opening to provide access to the region of said gimbal; an adjustable weight supported on said gimbal and radially adjustable relative to said axis extending through said gimbal; positioning means for radially positioning said weight relative to said axis; and actuating means axially movable relative to said axis and through said access opening either into or out of engagement with said positioning means and operable to actuate said positioning means once such engagement is established and while such engagement is maintained.

8. In combination, a gyro gimbal-mounted about a sensitive axis; a balance weight; a support mounted on the gyro to support the weight and to enable the balance weight to be adjustably positioned on said gyro to establish a static balance in the gyro relative to said axis; a hermetically sealed outer housing enclosing the gyro and the balance weight, said housing having an access opening to permit access through said opening for adjustably positioning said balance weight; means embodying a sealed diaphragm with a limited degree of lost motion sealing said access opening; and an actuator supported on said diaphragm and operable from outside said diaphragm for adjustably positioning said weight to achieve said static balance.

References Cited in the file of this patent

UNITED STATES PATENTS

| | | |
|---|---|---|
| 1,137,258 | Chessin | Apr. 26, 1915 |
| 1,403,062 | Sperry | Jan. 10, 1922 |
| 2,650,502 | Lundberg et al. | Sept. 1, 1953 |